United States Patent [19]

Takamure et al.

[11] Patent Number: 5,428,489
[45] Date of Patent: Jun. 27, 1995

[54] MAGNET HEAD SUPPORT DEVICE FOR USE IN MAGNETIC DISK DRIVE EQUIPPED WITH FLOATING HEAD SLIDER

[75] Inventors: Hisayoshi Takamure, Kumamoto; Hisashi Kano, Yamaga, both of Japan

[73] Assignee: Matsushita Electric Industrial Co., Ltd., Osaka, Japan

[21] Appl. No.: 215,664

[22] Filed: Mar. 22, 1994

Related U.S. Application Data

[63] Continuation of Ser. No. 846,882, Mar. 6, 1992, abandoned.

[30] Foreign Application Priority Data

Mar. 8, 1991 [JP] Japan .................. 3-043809

[51] Int. Cl.⁶ .................................. G11B 5/48
[52] U.S. Cl. ................................... 360/104
[58] Field of Search ............................ 360/104

[56] References Cited

U.S. PATENT DOCUMENTS

| | | | |
|---|---|---|---|
| 3,914,792 | 10/1975 | Beecroft | 360/104 X |
| 4,811,143 | 3/1989 | Ohashi | 360/104 X |
| 4,884,154 | 11/1989 | Onodera | 360/104 |
| 4,943,875 | 7/1990 | Reidenbach | 360/104 |
| 4,996,616 | 2/1991 | Aoyagi | 360/104 |
| 5,057,953 | 10/1991 | Wanlass | 360/104 |
| 5,065,268 | 11/1991 | Hagen | 360/104 |
| 5,115,363 | 5/1992 | Khan | 360/104 |
| 5,198,945 | 3/1993 | Blaeser | 360/104 |
| 5,282,102 | 1/1994 | Christianson | 360/104 |

*Primary Examiner*—A. J. Heinz
*Attorney, Agent, or Firm*—Pollock, Vande Sande & Priddy

[57] ABSTRACT

A magnetic head support device has a canti-levered flexure mounted at one end on an arm and having a recess defined in the opposite end thereof. A gimbal is supported on the flexure and disposed in the recess, and a head slider is mounted on the gimbal. The flexure also has a pair of spaced support legs on opposite sides of the recess, with the gimbal having a pair of opposite portions supported respectively on the support legs. The flexure includes a pair of bent lips extending along respective opposite edges thereof in spaced relationship to the arm. The flexure also includes a leaf spring connected to the arm. The leaf spring has a through opening defined therein or is at least partly thinner than the remainder of the flexure.

25 Claims, 3 Drawing Sheets

MAGNET HEAD SUPPORT DEVICE FOR USE IN MAGNETIC DISK DRIVE EQUIPPED WITH FLOATING HEAD SLIDER

This application is a continuation of Ser. No. 07/846,882 filed on Mar. 6, 1992 now abandoned.

BACKGROUND OF THE INVENTION

1. Field of the Invention

The present invention relates to a magnetic head support device for supporting a magnetic read/write head in a magnetic disk drive.

2. Description of the Prior Art

There are known magnetic disk drives having a magnetic head on a floating head slider for recording and reproducing information on the surface of a rotating magnetic disk. Such magnetic disk drives are in widespread use for information recording apparatus, In the magnetic disk drives, the magnetic head is supported on a magnetic head support device including a flexure. The magnetic head has a floating head slider mounted on the tip end of the flexure by a gimbal, so that the magnetic head can be lifted off the surface of the magnetic disk for quick movement to a desired track on the magnetic disk.

Recently, there has been a demand for high-density information recording on a magnetic disk with a magnetic head whose floating head slider is displaced off the magnetic disk by a small distance while at the same time maintaining reliable interfacing between the magnetic head and the magnetic disk. The floating head slider is kept out of contact with the magnetic disk under a negative pressure or a vacuum developed between the head slider and the magnetic disk. More specifically, when the magnetic disk is not rotating, the head slider is spaced a certain distance from the surface of the magnetic disk by an arcuately curved member on a leaf spring of the flexure of the magnetic head support device. When the magnetic disk is rotating at a constant speed and the head slider is moved toward the magnetic disk surface, a dynamic pressure starts being developed on the head slider. When the dynamic pressure and an external load acting on the leaf spring of the flexure are in equilibrium, the head slider is kept a slight distance off the magnetic disk surface under the vacuum developed in the gap between the head slider and the magnetic head. At this time, an air film is produced in the gap, and the rigidity of such an air film is about five times larger than the ridigity of an air film that is developed between a magnetic disk and a head slider lifted off the magnetic disk under a positive pressure. Consequently, the head slider stably follows surface undulations of the magnetic disk even when the gap between the head slider and the magnetic disk is small, When the speed of rotation of the magnetic disk is reduced, the dynamic pressure acting on the head slider is also reduced. When the dynamic pressure is reduced to the extent that the dynamic pressure and the external load are brought out of equilibrium, the head slider is displaced away from the magnetic disk surface back to the position it takes when the magnetic disk is at rest.

Today, magnetic disk drives are required to handle, i.e., read and write, an increasing amount of data and hence to process a large amount of data at high speed. Efforts to shorten the access time of magnetic heads are very important in the data processing technology related to the magnetic disk drives, and various technical developments have heretofore been made under such efforts. The access time is equal to the sum of a seek time that is required for the magnetic head to move radially to a circumferential line on the magnetic disk which includes a target track to be reached, and a wait time that is required for the target track to come to the magnetic head. Since the wait time is dependent on the speed of rotation of the magnetic disk, it cannot be shortened greatly. Actually, the wait time has remained almost unchanged for more than ten years in the past. Consequently, development efforts for shortening the access time of magnetic heads have concentrated on the reduction of the seek time in which the magnetic heads move radially to a circumferential line corresponding to a desired track on the magnetic disk. The seek time can be shortened by using an actuator of higher output power for moving the magnetic head support device and by reducing the weight of an angularly driven mechanism, including the magnetic head support device and the magnetic head, which mechanism is coupled to the actuator and is to be angularly moved radially over the magnetic disk. There is a limitation on attempts to increase the output power of the actuator because the capacity of the magnet of the actuator and the drive current supplied to the actuator cannot be increased substantially in view of the intensity of heat generated by the actuator, the weight of the actuator, and the cost of the actuator. As a consequence, it is necessary to design the angularly driven mechanism coupled to the actuator for a reduced weight and a required high rigidity in order to allow the magnetic head to access desired tracks at high speed.

The high rigidity and low weight of the angularly driven mechanism is also important from the standpoint of desired positioning control of the magnetic head. The magnetic head is positionally controlled by a closed control loop whose frequency range is limited by the resonance of the angularly driven mechanism in its vibration mode and is selected to be lower than the mechanical resonant frequency of the angularly driven mechanism so as not to adversely affect the closed control loop. Therefore, the higher the mechanical resonant frequency of the angularly driven mechanism, the stabler the magnetic head positioning control and the wider the frequency range of the closed control loop, with resultant high-accuracy positioning of the magnetic head.

With the conventional magnetic head support devices, as described above, the distal end of the flexure is shaped in a surrounding relationship to the head slider, and hence is relatively heavy. In order to allow the magnetic head to quickly access a desired track position on the magnetic disk, it is preferable hat the components coupled to the actuator be as light in weight as possible. Since the moment of inertia of an element is proportional to the mass of the element and the square of its distance from the center of rotation of the element, even a slight increase in the mass of the angularly driven mechanism that is positioned on the distal end of the magnetic head support device gives rise to a large increase in the moment of inertia, resulting in an obstacle to high-speed accessing movement of the magnetic head.

Inasmuch as the flexure is relatively heavy due to the configuration of its distal end that surrounds the head slider, the mechanical resonant frequency of the angularly driven mechanism or the magnetic head support device cannot be increased.

Another problem of the conventional magnetic head support device is as follows: Electric wires connected to the magnetic head extend across and around the edge of the distal end of the flexure in contact therewith so that they will not exert undue stresses on the magnetic head. However, the electric wires tend to be abraded by the flexure edge on account of vibrations caused by the magnetic head while the magnetic disk is rotating. As a result, the coverings of the electric wires may be peeled or torn off, causing a short circuit between the electric wires and the flexure, so that the output signal from the magnetic head will be cut off. Peeled- or torn-off fragments or dust particles of the coverings may be conducive to a crash of the magnetic head during operation of the magnetic head drive.

SUMMARY OF THE INVENTION

In view of the aforesaid shortcomings of the conventional magnetic head support devices, it is an object of the present invention to provide a magnetic head support device which is relatively light in weight for high-speed accessing movement and which has a relatively high mechanical resonant frequency.

According to the present invention, there is provided a magnetic head support device comprising an arm, a flexure mounted at one end thereof on the arm and having a pair of bent lips extending along respective opposite edges thereof in spaced relationship to the arm, the flexure having a recess defined in an opposite end thereof between the lips, the recess having an outwardly opening side, a gimbal supported on the flexure and disposed in the recess, and a head slider mounted on a surface of the gimbal.

According to the present invention, there is also provided a magnetic head support device comprising an arm, a cantilevered sheet flexure mounted at one end thereof on the arm, the flexure having a recess defined in an opposite distal end thereof and a pair of spaced support legs on opposite sides of the recess, the recess having an outwardly opening side, a gimbal disposed in the recess, the gimbal having a pair of opposite portions supported respectively on the support legs, and a head slider mounted on the gimbal.

The flexure includes a leaf spring near connected to the arm, the leaf spring having a through opening defined therein or at least a portion thinner than the remainder of the flexure.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
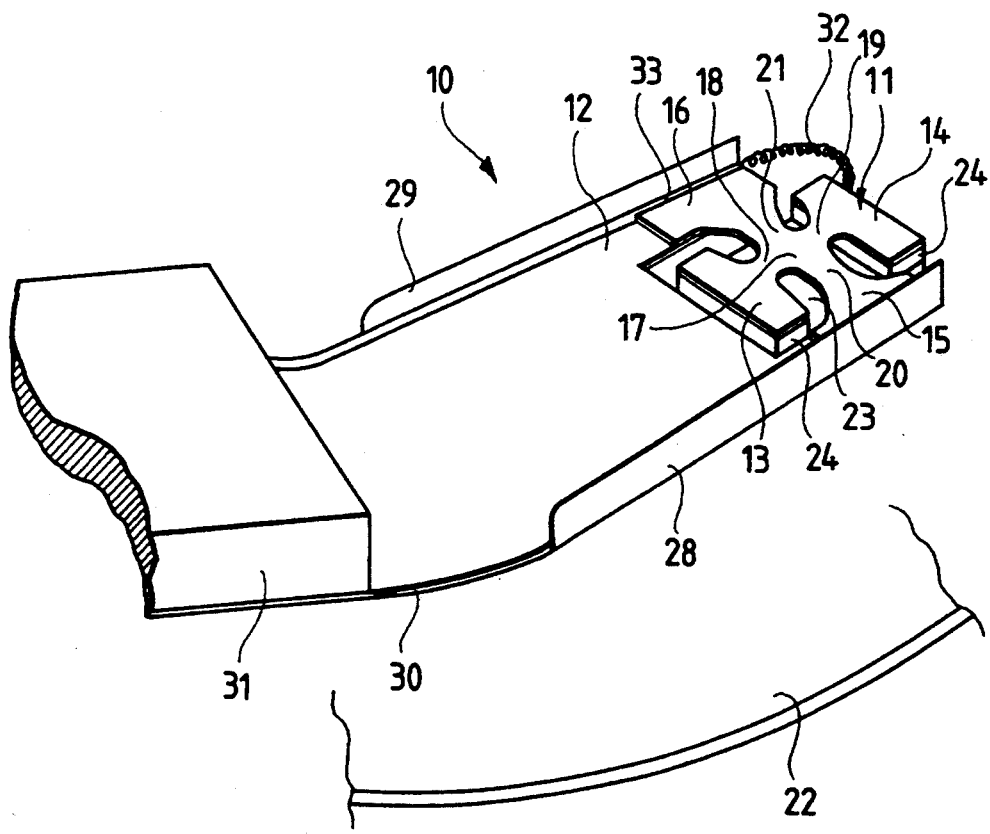
FIG. 1 is a perspective view of a magnetic head support device according to an embodiment of the present invention.

Identical parts are denoted by identical reference numerals throughout views.

FIG. 1 shows a magnetic head support device according to an embodiment of the present invention. The magnetic head support device is typically designed for use in a magnetic head drive for writing data on and reading data from a suitable magnetic data storage medium such as a magnetic disk.

As shown in FIG. 1, the magnetic head support device, generally designated by the reference numeral 10, includes a gimbal 11 mounted on a distal end of a flexure or a resiliently flexible support member 12. The gimbal 11 is in the form of a thin metal sheet and has a pair of diametrically opposite arms or branches 13, 14 and another pair of diametrically opposite arms or branches 15, 16, the branches 13~16 extending radially outwardly from a central region 17 of the gimbal 11. The branches 13~16 have respective necks or constrictions 18, 19, 20, 21 by which they are connected to the central region 17.

A magnetic head for writing data on and reading data from a magnetic disk 22 has a head slider 23 that is bonded through a pair of spacers 24 to the lower surfaces of the branches 13, 14 of the gimbal 11.

Figure 2:
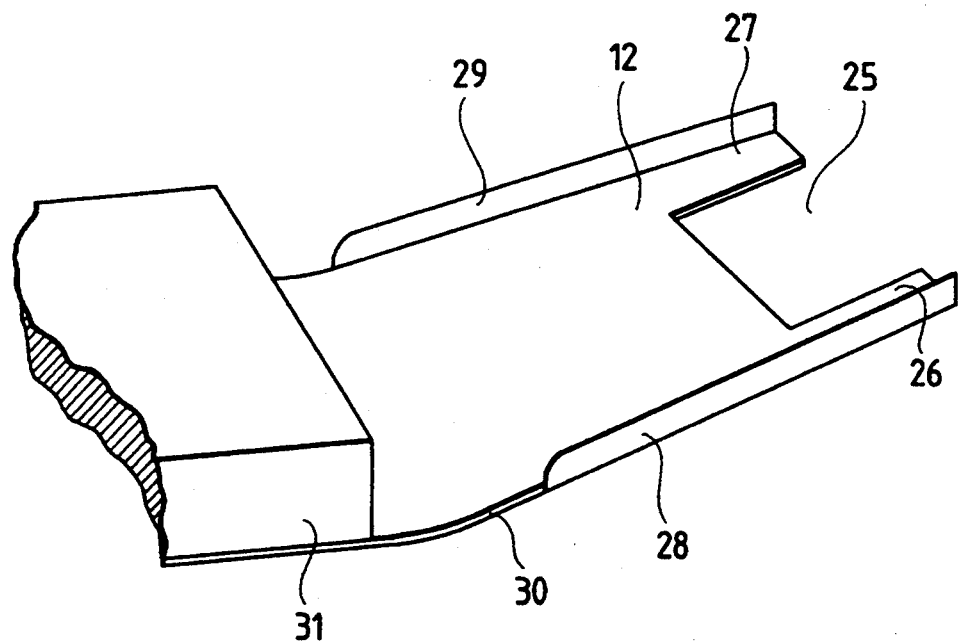
FIG. 2 is a perspective view of a flexure of the magnetic head support device.

As shown in FIG. 2, the flexure 12 is in the form of a cantilevered thin sheet, and comprises an elongate metal sheet having a rectangular cutout or recess 25 defined in the distal end thereof with on side opening outwardly. The distal end of the flexure 12 has a pair of spaced support legs 26, 27 on the opposite sides of the recess 25. The support legs 26, 27 are just long enough to support the gimbal 11 thereon. More specifically, as shown in FIG. 1, the gimbal 11 is positioned in the recess 25 with the branches 15, 16 supported on and bonded or welded to the respective support legs 26, 27. One of the branches 13 is disposed within the recess 25, whereas the other branch 14 is positioned outside of the recess 25 across its open side. The support legs 26, 27 should not be longer than necessary to support the gimbal 11. That is, the support legs 26, 27 have distal ends that are aligned with respective outer side edges of the branches 15, 16 when the branches 15, 16 are supported on the respective support legs 26, 27.

The flexure 12 has a pair of upwardly directed lips 28, 29 extending along its longitudinal opposite edges to the distal end thereof with the recess 25 positioned between the lips 28, 29. Typically, the lips 28, 29 are bent upwardly by a press. The lips 28, 29 serve to stiffen the flexure 12 for a sufficient degree of rigidity for securely supporting the gimbal 11 and the head slider 23. The flexure 12 includes an arcuately bent leaf spring 30 at its end, where the lips 28, 29 terminate, remote from the recess 25, the leaf spring 30 being fixed to the lower surface of an arm 31. The leaf spring 30 serves to apply a pressure to the head slider 23 in a direction normal to the magnetic disk 22 while the magnetic disk 22 is rotating. The arm 31 is connected to an actuator (not shown) such as an electric motor. The lips 28, 29 terminate short of, or are spaced from, the arm 31 with the leaf spring 30 interposed between the ends of the lips 28, 29 and the arm 31.

Electric wires 32 that are electrically connected to the magnetic head extend from below the branch 14 outside of the recess 25 arcuately around the distal end of the flexure 12 out of abrasive contact therewith toward the distal end of the support leg 27, and then extend through a protective tube 33 mounted on the upper surface of the flexure 12 along one of the upturned lips 29 toward the arm 31. The electric wires 32 are electrically connected to an electric circuit (not shown) in the magnetic head drive.

Operation of the magnetic head support device shown in FIGS. 1 and 2 will be described below. While the magnetic disk 22 is rotating, the head slider 23 is kept a slight distance off the surface of the magnetic disk 22. The head slider 23 follows surface undulations of the rotating magnetic disk 22 at all times. Specifically, the head slider 23 moves perpendicularly to the magnetic disk 22 under the resiliency of the leaf spring 30 and the vacuum developed in the air gap between the magnetic head and the surface of the magnetic disk 22 to keep the magnetic head spaced a constant distance from the magnetic disk 22 irrespective of surface undulations of the rotating magnetic disk 22. The head slider 23 also makes pitching and rolling movement to follow the surface undulations of the rotating magnetic disk 22 to maintain the air gap between the magnetic head and the surface of the magnetic disk 22. The pitching movement is an angular movement about a transverse axis extending through the branches 15, 16, and the rolling movement is an angular movement about a longitudinal axis extending through the branches 13, 140 Such pitching and rolling movement of the head slider 23 is made possible by the necks 18~21 as they are twisted about their axes. The gimbal 11 has no projection as a pivot for the pitching and rolling movement, and the axes of the pitching and rolling movement pass through the central region 17, i,e., near the center of gravity of the gimbal For these reasons, any moment applied to the head slider 23 to cause the pitching and rolling movement is relatively small. As a consequence, the head slider 23 is capable of well following surface undulations of the rotating magnetic disk 22.

With the magnetic head kept off the magnetic disk 22, the magnetic head drive device is angularly moved about an actuator axis by the actuator to enable the magnetic head to move radially across tracks on the magnetic disk 22 in a random seek mode.

The flexure 12 is reduced in weight because of the recess 25 defined in the distal end thereof. The weight of the flexure 12 is particularly small at its distal end, reducing the moment of inertia applied to the flexure 12. Therefore, the magnetic head support device is relatively light in weight. In the random seek mode, the magnetic head can thus move at increased speed, and the mechanical resonant frequency of the magnetic head support device is relatively high. Consequently, the magnetic head can be positioned with respect to the magnetic disk 22 under a highly accurate positioning control process. The 10 electric wires 32 connected to the magnetic head extend arcuately around the distal end of the flexure 12 out of contact therewith, so that they can absorb undue stresses which would otherwise be applied through the electric wires 32 to the magnetic head. The electric wires 32 do not physically interfere with the movement of the head slider 23 to follow the surface undulations of the magnetic disk 22. The electric wires 32 are not peeled or torn off and hence do not produce peeled- or torn-off fragments or dust particles since the electric wires 32 are not in abrasive contact with the flexure 12.

Figure 3:
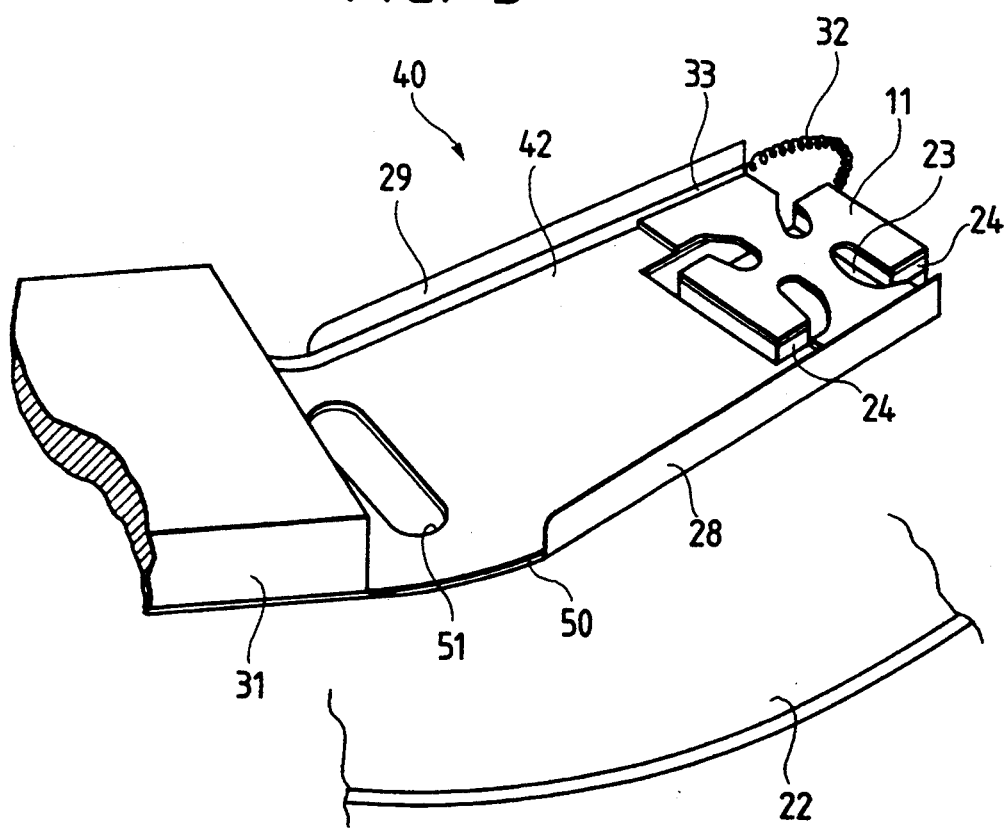
FIG. 3 is a perspective view of a magnetic head support device according to another embodiment of the present invention.

FIG. 3 shows a magnetic head support device according to another embodiment of the present invention. The magnetic head support device, generally designated by the reference numeral 40, shown in FIG. 3 differs from the magnetic head support device 10 shown in FIGS. 1 and 2 in that a flexure 42 includes a leaf spring 50 having a through opening 51 defined therein. When the leaf spring 42 is angularly bent, it can be shaped to higher accuracy if it is angularly bent through a greater angle. Therefore, it is desirable that the rigidity of the leaf spring 50 be smaller and the flexure 42 be angularly bent through a larger angle for a uniform pressure applied to the head slider 23 and a stable distance by which the head slider 23 is kept from the magnetic disk 22 while it is rotating. The opening 51 defined in the leaf spring 50 reduces the rigidity thereof and allows the flexure 42 to be 10 angularly bent through a relatively large angle. Varying the shape of the opening 51 is effective to freely vary the angle through which the flexure 42 is angularly bent and the pressure which is applied to the head slider 23 while the magnetic disk 22 is rotating.

Figure 4:
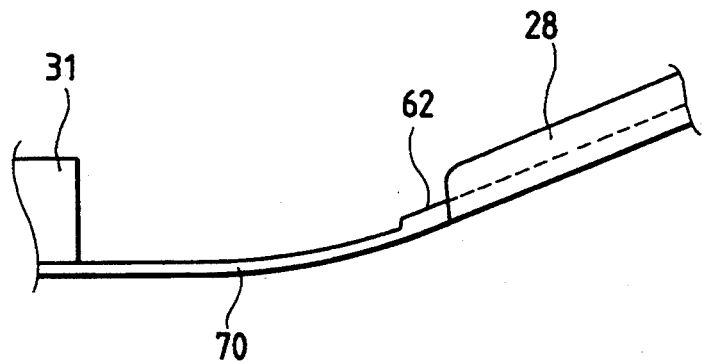
FIG. 4 is a fragmentary side elevational view of a modified flexure.

The rigidity of the leaf spring of a flexure would be reduced by thinning the flexure in its entirety. However, the rigidity of the entire flexure including the leaf spring would also be reduced, lowering the mechanical resonant frequency of the magnetic head support device. As a result, a closed-control loop for positional control of the magnetic head would be adversely affected. To avoid this drawback, as shown in FIG. 4, only a leaf spring 70 of a flexure 62 is made thinner either entirely or partly than the other flexure portion by etching or rolling for a reduced rigidity, whereas the other flexure portion remains unchanged in thickness. Such localized thinning of the leaf spring 70 is as advantageous as the through hole 51 defined in the leaf spring 50 shown in FIG. 3.

Figure 5:
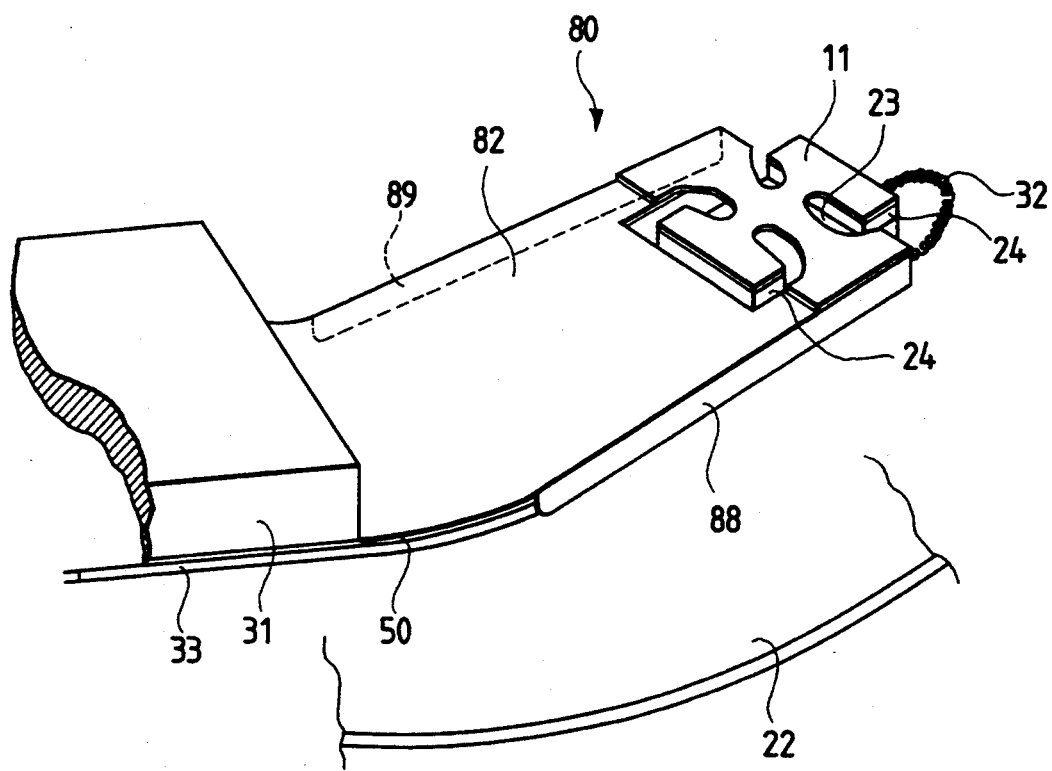
FIG. 5 is a perspective view of a magnetic head support device according to still another embodiment of the present invention.

FIG. 5 is a perspective view of a magnetic head support device according to still another embodiment of the present invention. As shown in FIG. 5, the magnetic head support device, generally designated by the reference numeral 80, has a flexure 82 including a pair of downwardly directed lips 88, 89 extending along its longitudinal opposite edges to the distal end thereof. The lips 88, 89 are therefore directed toward the magnetic disk 22. The protective tube 33 housing the electric wires 32 connected to the magnetic head is mounted on the lower surface of the flexure 82 and extends along the lip 88. Since the lips 88, 89 are directed downwardly and the head slider 23 is attached to the lower surface of the gimbal 11, the magnetic head support device 80 is of a relatively low profile with its height being equal to the sum of the thickness of the head slider 23 and the thickness of the gimbal 11. The magnetic disk drive with the low-profile magnetic head support device 80 incorporated therein may also be of a low profile. The magnetic head support device shown in FIG. 5 is particularly advantageous when employed in a multidisk magnetic disk drive designed for storing a plurality of magnetic disks because the magnetic disk drive with low-profile magnetic head support devices may also be of a low profile.

Although certain preferred embodiments of the present invention have been shown and described in detail, it should be understood that various changes and modifications may be made therein without departing from the scope of the appended claims.

We claim as our invention:

1. A magnetic head support device comprising:
   an arm;

a flexure mounted at a base end thereof on said arm and having a pair of bent lips extending along respective opposite edges thereof in spaced relationship to said arm, said flexure having a cutout defined in a distal end thereof between said lips, said cutout defining an opening in a distal transverse edge of the flexure;

a separate gimbal supported on said flexure and disposed in said cutout;

a floating head slider mounted on a surface of said gimbal;

said gimbal including a central region and two pairs of branches, extending perpendicularly to each other, a first pair of branches having inner ends connected to said central region and outer ends connected to said floating head slider and a second pair of branches having inner ends connected to said central region and outer ends connected to said flexure, said first and second pairs of branches extending radially outwardly from said central region of said gimbal, said first and second pairs of branches having necks by which they are connected to said central region, said first pair of branches extending oppositely along a longitudinal direction of said flexure from said central region while said second branches extending oppositely along a direction normal to the longitudinal direction of said flexure; and said floating head being connected to only said first pair of branches at lower surfaces of distal ends thereof.

2. A magnetic head support device according to claim 1, wherein said flexure has a through opening defined therein between said lips and said arm.

3. A magnetic head support device according to claim 1, wherein said flexure has, near said arm, a portion thinner than the remainder of the flexure.

4. A magnetic head support device according to claim 3, wherein the thinner portion of said flexure is thinned by etching or rolling.

5. A magnetic head support device according to claim 1, wherein said lips project in a first direction away from said floating head slider perpendicular to said surface of the gimbal.

6. A magnetic head support device according to claim 1, wherein said lips are bent in a second direction perpendicular to said surface of the gimbal.

7. A magnetic head support device according to claim 1, wherein said lips extend to said distal end of said flexure.

8. A magnetic head support device according to claim 1, wherein said gimbal has a portion disposed across said recess.

9. A magnetic head support device according to claim 1, further including electric wires extending from said head slider arcuately around said distal end of said flexure out of contact therewith.

10. A magnetic head support device in accordance with claim wherein said floating head is connected to said first pair of branches at lower surfaces of distal ends thereof through a pair of spacers.

11. A magnetic head support device comprising:
an arm;
a cantilevered sheet flexure mounted at a base end thereof on said arm, said flexure having a cutout defined in a distal end thereof and a pair of spaced support legs on opposite sides of said cutout, said cutout defining an opening in a distal transverse edge of the flexure;

a separate gimbal disposed in said cutout;

a floating head slider mounted on said gimbal;

said gimbal including a central region connected to first and second pairs of branches, said first pair of branches having inner ends connected to said central region and outer ends connected to said floating head slider and said second pair of branches having inner ends connected to said central region and outer ends connected to said support legs of said flexure, said first and second pairs of branches extending radially outwardly from said central region of said gimbal, said first and second pairs of branches having necks by which they are connected to said central region, said first pair of branches extending oppositely along a longitudinal direction of said flexure from said central region and said second pair of branches extending oppositely along a direction normal to the longitudinal direction of said flexure; and said floating head being connected to only said first pair of branches at lower surfaces of distal ends thereof.

12. A magnetic head support device according to claim 11, wherein said cantilevered sheet flexure includes a leaf spring near said base end mounted on said arm, said leaf spring having a through opening defined therein.

13. A magnetic head support device according to claim 11, wherein said cantilevered sheet flexure includes a leaf spring near said base end mounted on said arm, said leaf spring having at least a portion thinner than the remainder of the flexure.

14. A magnetic head support device according to claim 13, wherein the thinner portion of said leaf spring is thinned by etching or rolling.

15. A magnetic head support device according to claim 11, wherein said cantilevered sheet flexure has a pair of bent lips extending along respective opposite edges thereof.

16. A magnetic head support device according to claim 15, wherein said lips project in a first direction away from said floating head slider perpendicular to a surface of the gimbal.

17. A magnetic head support device according to claim 15, wherein said lips are bent in a second direction perpendicular to a surface of the gimbal.

18. A magnetic head support device according to claim 11, wherein a pair of bent lips extend to said distal end of the flexure.

19. A magnetic head support device according to claim 11, wherein said gimbal has a portion disposed across said recess.

20. A magnetic head support device according to claim 11, further including electric wires extending from said head slider arcuately around said distal end of said flexure out of contact therewith.

21. A magnetic head support device in accordance with claim 11, wherein said floating head is connected to said first pair of branches lower surfaces of distal ends thereof through a pair of spacers.

22. A magnetic head support device comprising:
an arm;
a flexure mounted at a base end thereof on said arm and having a pair of bent lips extending along respective opposite edges thereof in spaced relationship to said arm, said flexure having a through opening defined therein between said lips and said arm, said flexure having a cutout defined in a distal end thereof between said lips, said cutout defining an opening in a distal transverse edge of the flexure;

a separate gimbal supported on said flexure and disposed in said cutout;

a floating head slider mounted on a surface of said gimbal, said gimbal including a central region and two pairs of branches, a first pair of branches having inner ends connected to said central region and outer ends connected to said floating head slider, and a second pair of branches having inner ends connected to said central region and outer ends connected to said flexure, said first and second pairs of branches extending radially outwardly from said central region of said gimbal, said first and second pairs of branches having necks by which they are connected to said central region, said first pair of branches extending oppositely along a longitudinal direction of said flexure from said central region, said second pair of branches extending oppositely along a direction normal to the longitudinal direction of said flexure; and said floating head being connected to only said first pair of branches at lower surfaces of distal ends thereof.

23. A magnetic head support device in accordance with claim 22, wherein said floating head is connected to said first pair of branches at lower surfaces of distal ends thereof through a pair of spacers.

24. A magnetic head support device comprising:

an arm;

a flexure mounted at a base end thereof on said arm and having a pair of bent lips extending along respective opposite edges thereof in spaced relationship to said arm, said flexure having a portion thinner than the remainder of the flexure near said arm, said flexure having a cutout defined in a distal end thereof between said lips, said cutout defining an opening in a distal transverse edge of the flexure;

a separate gimbal supported on said flexure and disposed in said cutout;

a floating head slider mounted on a surface of said gimbal, said gimbal including a central region and two pairs of branches, a first pair of branches having inner ends connected to said central region and outer ends connected to said floating head slider, and a second pair of branches having inner ends connected to said central region and outer ends connected to said flexure, said first and second pairs of branches extending radially outwardly from said central region of said gimbal, said first and second pairs of branches having necks connected to said central region, said first pair of branches extending oppositely along a longitudinal direction of said flexure from said central region, said second pair of branches extending oppositely along a direction normal to the longitudinal direction of said flexure; and said floating head being connected to only said first pair of branches at lower surfaces of distal ends thereof.

25. A magnetic head support device in accordance with claim 24, wherein said floating head is connected to said first pair of branches at lowering surfaces of distal ends thereof through a pair of spacers.

* * * * *